US012103829B2

(12) United States Patent
Omura

(10) Patent No.: US 12,103,829 B2
(45) Date of Patent: Oct. 1, 2024

(54) ELECTRIC CHAIN BLOCK

(71) Applicant: Kito Corporation, Yamanashi (JP)

(72) Inventor: Shinya Omura, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 263 days.

(21) Appl. No.: 17/910,360

(22) PCT Filed: Dec. 23, 2020

(86) PCT No.: PCT/JP2020/048078
§ 371 (c)(1),
(2) Date: Sep. 9, 2022

(87) PCT Pub. No.: WO2021/181820
PCT Pub. Date: Sep. 16, 2021

(65) Prior Publication Data

US 2023/0138172 A1 May 4, 2023

(30) Foreign Application Priority Data

Mar. 9, 2020 (JP) ................................ 2020-040047

(51) Int. Cl.
*B66D 3/26* (2006.01)
*B66D 3/20* (2006.01)
*B66D 3/16* (2006.01)

(52) U.S. Cl.
CPC ................ *B66D 3/26* (2013.01); *B66D 3/20* (2013.01); *B66D 3/16* (2013.01)

(58) Field of Classification Search
CPC ... B66D 3/18; B66D 3/20; B66D 3/24; B66D 3/26; B66D 3/36
See application file for complete search history.

(56) References Cited

U.S. PATENT DOCUMENTS 3,289,626 A * 12/1966 Petrie ...................... B63B 21/18 114/200
3,382,730 A * 5/1968 Roggatz .................. B66D 3/26 474/140

(Continued)

FOREIGN PATENT DOCUMENTS

DE 102019118225 B3 * 10/2020 .............. B66D 3/26
EP 0692447 A1 1/1996

(Continued)

OTHER PUBLICATIONS

International Search Report and Written Opinion mailed on Feb. 2, 2021, received for PCT Application PCT/JP2020/048078, filed on Dec. 23, 2020, 11 pages including English Translation.

*Primary Examiner* — Michael R Mansen
*Assistant Examiner* — Nathaniel L Adams
(74) *Attorney, Agent, or Firm* — XSENSUS LLP

(57) ABSTRACT

A chain inlet/outlet, from which a load chain on a load side is hauled in or paid out, has a first guide groove having a first longitudinal groove and a first lateral groove. The chain inlet/outlet also has a second guide groove that is provided on a deeper side of a body part than the first guide groove is and has a second longitudinal groove and a second lateral groove. The first guide groove has narrowed parts that determine, when each link of the load chain is pulled in, into which of the first longitudinal groove and the first lateral groove the link is introduced, and expanded groove parts having a width larger than the groove width of the narrowed parts and provided on the outer side, farther away from the center of the chain inlet/outlet than the narrowed parts.

5 Claims, 10 Drawing Sheets

(56) References Cited

U.S. PATENT DOCUMENTS

| | | | | | |
|---|---|---|---|---|---|
| 5,007,617 | A * | 4/1991 | Nishimura | ............... | B66D 3/14 254/358 |
| 2016/0031684 | A1 * | 2/2016 | Weingartner | ............ | B66D 1/36 254/389 |

FOREIGN PATENT DOCUMENTS

| | | | | | |
|---|---|---|---|---|---|
| EP | 2931650 | B1 | 9/2019 | | |
| JP | 45-36625 | B1 | 11/1970 | | |
| JP | 48-38677 | Y1 | 11/1973 | | |
| JP | 49-035093 | * | 9/1974 | ............... | B66D 3/26 |
| JP | 49-35093 | Y1 | 9/1974 | | |
| JP | 49-41780 | B1 | 11/1974 | | |
| JP | 55-180698 | U | 12/1980 | | |
| JP | 56-161297 | * | 12/1981 | ............... | B66D 3/24 |
| JP | 56-161297 | A | 12/1981 | | |
| JP | 56-170193 | U | 12/1981 | | |
| JP | 63-60576 | U | 4/1988 | | |

* cited by examiner

ELECTRIC CHAIN BLOCK

CROSS REFERENCE TO RELATED APPLICATIONS

This is a U.S. national stage of application No. PCT/JP2020/048078, filed on Dec. 23, 2020. Priority under 35 U.S.C. § 119(a) and 35 U.S.C. § 365(b) is claimed from Japanese Patent Applications No. 2020-040047 filed on Mar. 9, 2020. The entire contents and disclosures of each of the foregoing applications is incorporated herein by reference.

TECHNICAL FIELD

The present invention relates to an electric chain block.

BACKGROUND ART

In an electric chain block which lifts and lowers a load using the driving force of a motor, the load can be lifted and lowered by making a load chain get in/out though an inlet/outlet (hereinafter, referred to as a chain inlet/outlet) at a bottom surface of a body part. The chain inlet/outlet is provided in a cross shape when the chain inlet/outlet is viewed in plan view by a longitudinal groove and a lateral groove orthogonal to each other.

Incidentally, when the load chain is pulled into the inside of the body part 20 through the cross-shaped chain inlet/outlet, the direction of a link is adjusted at a stage before the link reaches the chain inlet/outlet in a state where the tension to the load chain acts in a vertical direction (for example, when the body part is suspended). Thus, the load chain can smoothly get in/out without jamming (getting stuck) near the chain inlet/outlet. However, in a state where no tension is applied to the load chain, especially, as in the case where the body part is placed on the floor, each of links constituting the load chain reaches the chain inlet/outlet in a state where each link is irregular in orientation. For this reason, the load chain may get stuck near the chain inlet/outlet.

Examples of the technique for preventing the load chain from getting stuck near the chain inlet/outlet as explained above include those disclosed in Patent Literature 1 to Patent Literature 3. In Patent Literature 1, a prismatic body (d) projecting from a bottom surface part is provided, and the prismatic body (d) separates a third link (3) which has already entered a cross groove, from the bottom surface. This prevents a head portion of the third link (3) from running into the groove, so that when a first link (1; a link entered the cross groove) is pulled in, a second link (2) is slightly rotated and, accompanying the rotation, the third link (3) can also be rotated to prevent the load chain from getting stuck.

Further, in the configuration disclosed in Patent Literature 2, an arc surface (9) is provided at an opening end portion of a chain inlet/outlet in a manner to cope with a case where a load chain is pulled into a cross-shaped groove from an oblique direction, so as to untangle links. In addition to this, depths on one side and the other side of a lateral link through hole (8) are varied.

In the configuration disclosed in Patent Literature 2, a certain type of being stuck can be released. More specifically, a longitudinal groove and a lateral groove of the chain inlet/outlet correspond to a length in a short side direction of an oval-shaped link. Accordingly, when the link becomes, in a long side direction, a bridging state of blocking the longitudinal groove or the lateral groove at a normal chain inlet/outlet, the load chain easily gets stuck, whereas the link enters, in an inclining state, the longitudinal groove or the lateral groove because of the presence of a depth B and a depth C in the configuration disclosed in Patent Literature 1. For this reason, when the link is pulled in, the link easily rotates to be able to release the load chain from being stuck.

Further, in a configuration disclosed in Patent Literature 3, an area near a chain inlet/outlet bulges more than the other bottom surface, and an inclined portion which becomes wider as going toward an opening is formed in a longitudinal groove and a lateral groove. This enables a link located on a top portion side of the bulging portion to rotate when pulling in the load chain, thereby preventing the load chain from getting stuck.

CITATION LIST

Patent Literature

{PTL 1} JP S45-36625 A
{PTL 2} JP S49-41780 A
{PTL 3} EP 2931650 B1

SUMMARY OF INVENTION

Technical Problem

Incidentally, when the motor continues to drive in a state where a lower hook collides with the bottom surface, the body part, the motor or the like may be damaged. Accordingly, it is necessary to detect that the lower hook collides with the bottom surface of the body part and, as one of means for detection, a press-type limit switch may be provided.

However, in the configurations disclosed in Patent Literature 1 to Patent Literature 3, the area near the chain inlet/outlet projects more than the bottom surface of the body part. For this reason, the limit switch cannot be pressed, or a need to add a separate member for the press arises.

Further, in the configuration disclosed in Patent Literature 2, when the link, in a rising state, enters the lateral groove or the longitudinal groove, it is possible to release the load chain from being stuck as explained above. However, the longitudinal groove and the lateral groove of the chain inlet/outlet have only a groove width corresponding to the diameter of the link. For this reason, the link does not completely rise but gets into a state of inclining sideways or tilting, and cannot release the load chain from being stuck depending on the position of a subsequent link.

The present invention has been made in consideration of the above circumstances, and has an object to provide an electric chain block in which it can be solved at least one of that a limit switch can be pressed by a lower hook colliding with a body part and that even if a link falls sideways or inclines, the link can easily enter a chain inlet/outlet.

Solution to Problem

To solve the above problem, according to a first aspect of the present invention, an electric chain block for hoisting or lowering a load chain coupled to a lower hook by rotating a load sheave by driving of a motor, the electric chain block includes: a body part including the motor and the load sheave; and a chain inlet/outlet which is provided at a bottom surface of the body part and through which the load chain on a load side gets in/out, wherein the chain inlet/outlet includes: a first guide groove which is provided on an opening side of the chain inlet/outlet, and includes a first longitudinal groove and a first lateral groove which have a groove length corresponding to a length in a long side direction of each link of the load chain, the first longitudinal groove and the first lateral groove orthogonally crossing each other; and a second guide groove which is provided on a side deeper in the body part than the first guide groove is, and includes a second longitudinal groove and a second lateral groove which have a groove length corresponding to a length in a short side direction of each link of the load chain, the second longitudinal groove and the second lateral groove orthogonally crossing each other, the first guide groove including: narrowed parts which face each other across a groove width corresponding to a wire diameter of the link of the load chain in a width direction of the first longitudinal groove and face each other across the groove width in a width direction of the first lateral groove to determine into which of the first longitudinal groove and the first lateral groove each link of the load chain is introduced when the link is pulled in; and expanded groove parts which are provided on an outside further away from a center of the chain inlet/outlet than the narrowed parts are, and have a width larger than the groove width.

Further, in the above embodiment, it is preferable that the first longitudinal groove and the first lateral groove are formed at a depth where the link to be pulled into the first longitudinal groove or the first lateral groove reaches an inside of the second guide groove and is rotatable in a manner to fall down using the link in contact with the bottom surface as a fulcrum.

Further, in the above embodiment, it is preferable that the narrowed parts are provided in a manner to be flush with the bottom surface and to continue into the bottom surface.

Further, in the above embodiment, it is preferable that at least a part of a pressed part of a limit switch is arranged to project in a space located in a range where a base part of the lower hook collides with the bottom surface near the chain inlet/outlet; and the pressed part is pressed to stop the driving of the motor.

Advantageous Effects of Invention

According to the present invention, an electric chain block can be provided in which a limit switch can be pressed by a lower hook colliding with a body part, and even if a link falls sideways or inclines, the link can easily enter a chain inlet/outlet.

DESCRIPTION OF EMBODIMENTS

Hereinafter, an electric chain block 10 according to an embodiment of the present invention will be explained with reference to the drawings. Note that in the following explanation, a Z-direction represents a direction in which a load chain C1 is suspended, and a Z1 side represents a side where an upper hook 70 is located and a Z2 side represents a side opposite thereto where a lower hook 80 is located. Accordingly, the Z1 side represents the upper side and the Z2 side represents the lower side in a normal suspension, whereas the Z1 side represents the lower side and the Z2 side represents the upper side in an inverted suspension. However, in this description, the Z1 side represents the upper side and the Z2 side represents the lower side unless otherwise stated.

Figure 1:
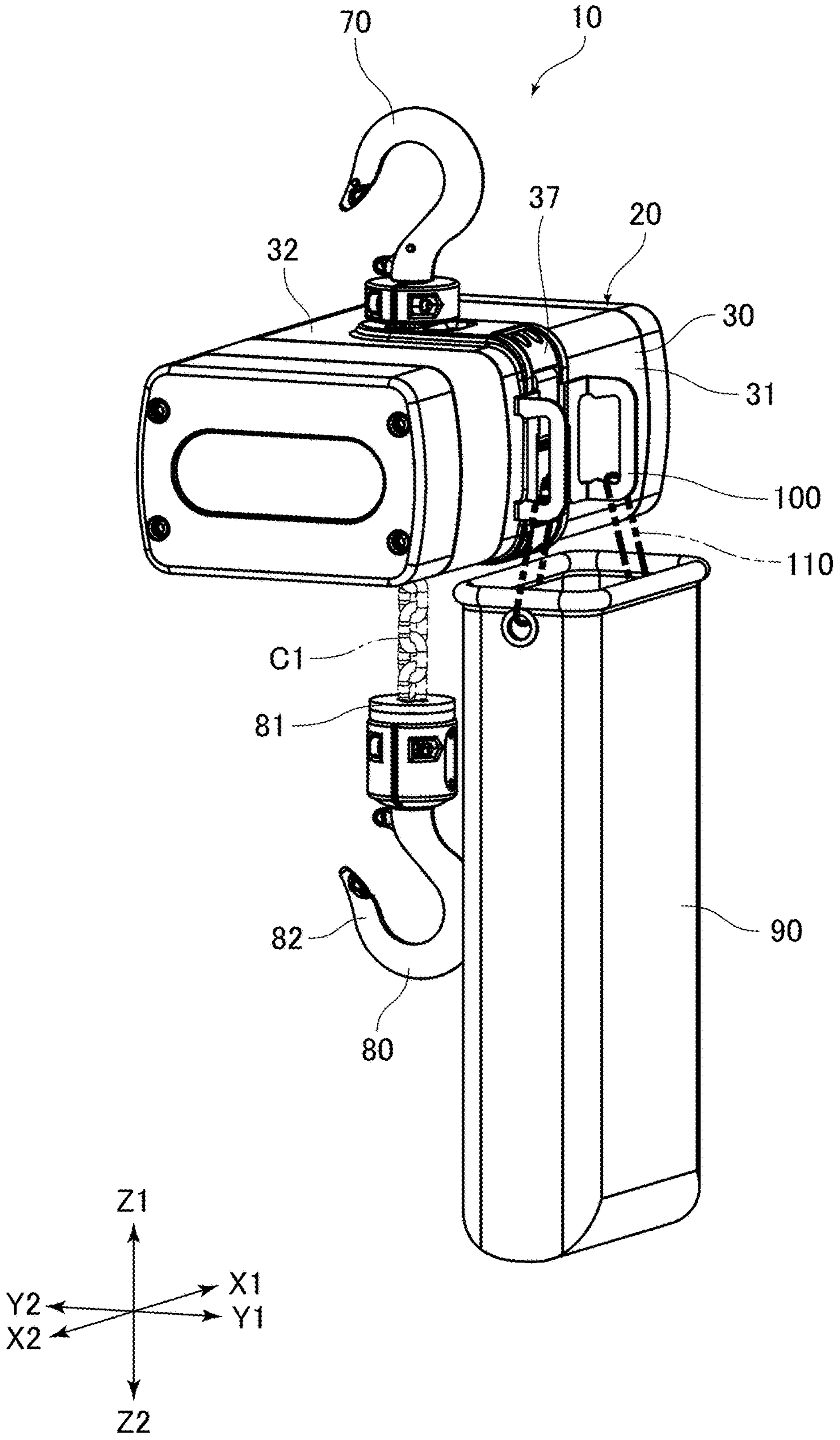
FIG. 1 is a perspective view illustrating a configuration of an electric chain block according to a first embodiment of the present invention.

Further, an X-direction represents a long side direction of a body part 20, and an X1 side represents an upper right side in FIG. 1 and an X2 side represents a lower left side opposite thereto. Further, a Y-direction represents a direction orthogonal to the Z-direction and to the X-direction, and a Y1 side represents a right side in FIG. 1 and a Y2 side represents a left side opposite thereto.

<Regarding the Overall Configuration of the Chain Block>

Figure 2:
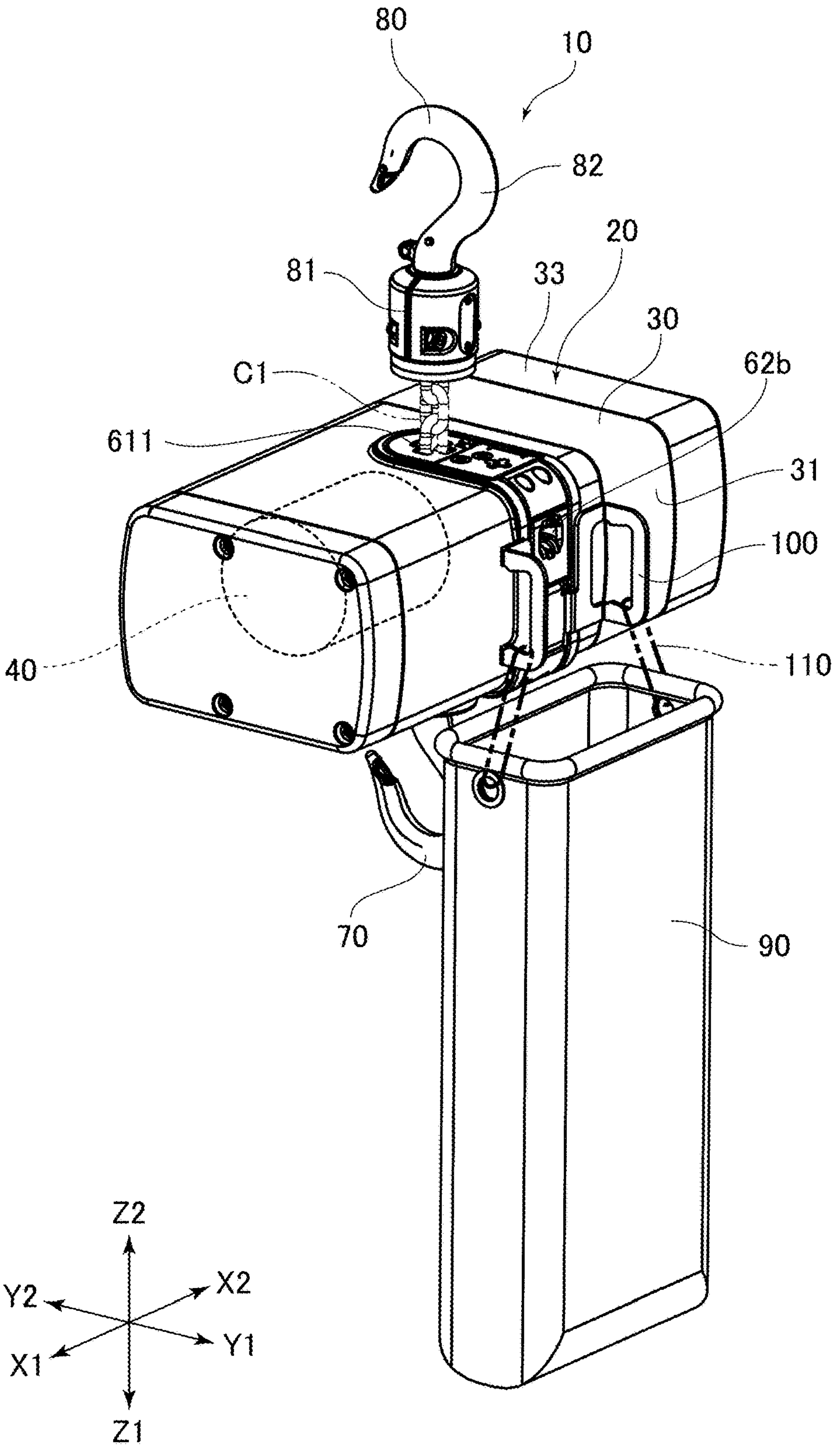
FIG. 2 is a perspective view illustrating a state of an inverted suspension in the electric chain block illustrated in FIG. 1.
Figure 3:
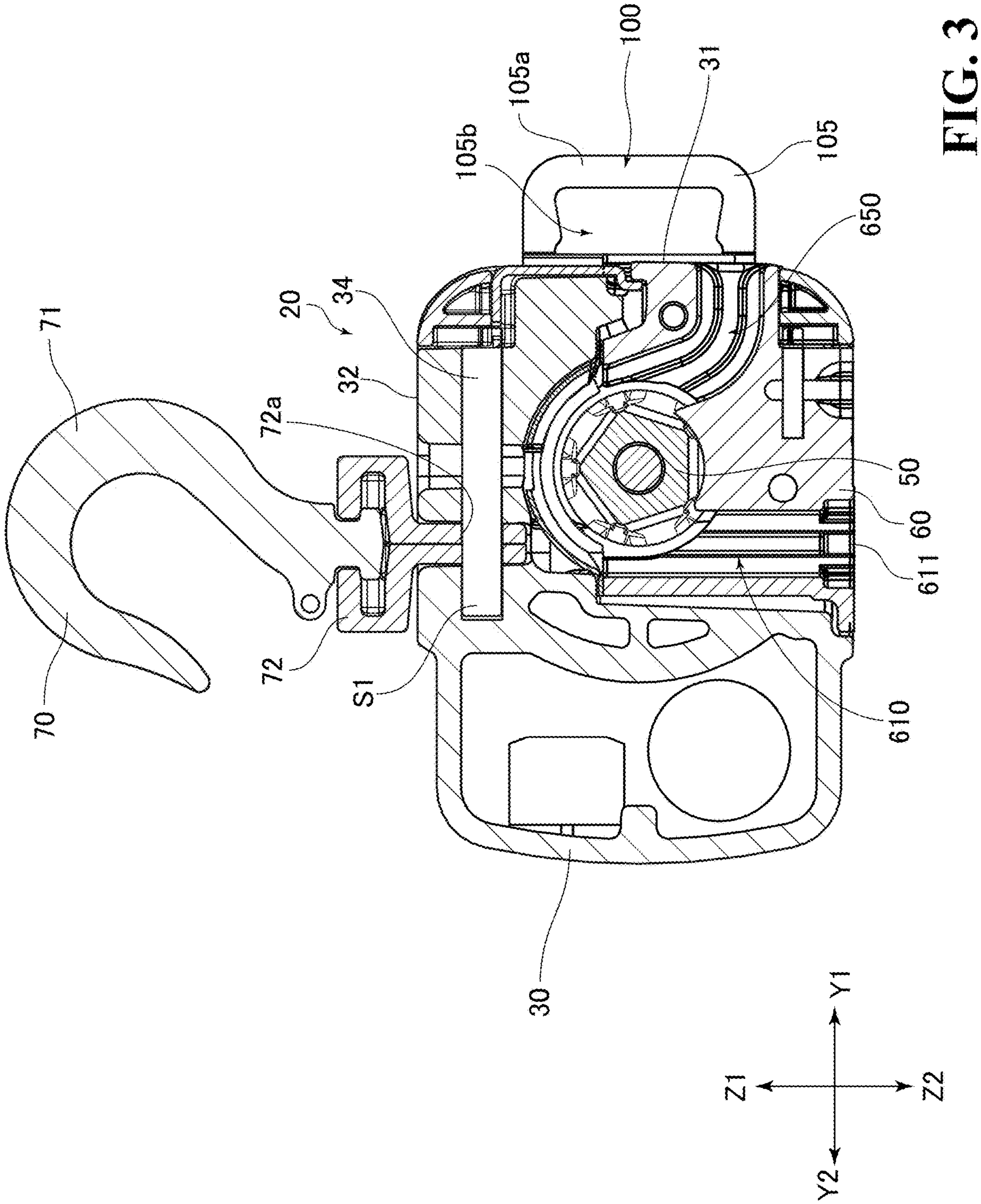
FIG. 3 is a cross-sectional view illustrating a configuration near a load sheave of the electric chain block illustrated in FIG. 1.

FIG. 1 is a perspective view illustrating a configuration of the electric chain block 10 according to an embodiment of the present invention. FIG. 2 is a perspective view illustrating a state of the inverted suspension in the electric chain block 10 illustrated in FIG. 1. FIG. 3 is a cross-sectional view illustrating the configuration near a load sheave 22 of the electric chain block 10 illustrated in FIG. 1. As illustrated in FIG. 1, the electric chain block 10 includes the body part 20, the upper hook 70, the lower hook 80, a chain bucket 90, and a bucket attachment bracket 100. Further, as illustrated in FIG. 1 and FIG. 2, the electric chain block 10 in this embodiment is a type capable of realizing both the normal suspension and the inverted suspension.

<Regarding the Body Part 20>

The body part 20 has a body 30, a motor 40, a load sheave 50, and a guide member 60 as primary components. Among them, the body 30 and the guide member 60 are integrally fixed by bolts or the like to constitute one housing.

<Regarding the Body 30>

The body 30 is formed of, for example, an aluminum-based metal or an iron-based metal as a material. As illustrated in FIG. 3, the body 30 has a portion which forms an outer surface such as a side surface 31 and a top surface 32, and a structure portion present inside the outer surface. Further, though the body 30 is dented from the outer surface at a section to which the later-explained guide member 60 is to be attached, the body part 20 is configured in a state almost without dent when the guide member 60 is attached to the body 30.

Inside the body 30, the motor 40 and the load sheave 50 are provided in a state of not being exposed to the outside. Further, to the body 30, the guide member 60 for guiding feed of the load chain C1 is also attached. The guide member 60 is a separate component from the body 21 in the configuration illustrated in FIG. 3, but the guide member 60 may be integrated with the body 30 (may be the same component as the body 30). Note that the details of the configuration of the guide member 60 will be explained later.

<Regarding the Motor 40 and the Load Sheave 50>

Further, inside the body 30, the driving force from the motor 40 is transmitted to the load sheave 50. The load sheave 50 includes a plurality of chain pockets 51, and a metal ring of the load chain C1 can fit into the chain pockets 51. Accordingly, driving of the motor 40 enables hoisting or lowering of the load chain C1.

<Regarding the Upper Hook 70 and a Link Shaft S1>

Further, to the body 30, the upper hook 70 is attached via a link shaft S1 inserted into a shaft hole 34 of the body 30. The upper hook 70 includes a hook part 71 and a hook receiving part 72. The hook part 71 is a portion on which a baggage, a ceiling or the like is hung. Further, the hook receiving part 72 is a portion which rotatably supports the hook part 71. The hook receiving part 72 is provided with an attachment hole 72*a* which penetrates the hook receiving part 72 in the Y-direction. Into the attachment hole 72*a*, the link shaft S1 is inserted. Thus, the upper hook 70 is supported by the body part 20 (body 30) via the link shaft S1.

<Regarding the Lower Hook 80>

The lower hook 80 includes a base part 81, and the base part 81 is coupled to a lower end side (Z2 side) of the load chain C1 fed from a chain inlet/outlet 611 (later explained) of a first guide passage 610 of the guide member 60. Further, the lower hook 80 includes a hook part 82 on which a baggage is hung, and the hook part 82 is attached, in a rotatable manner, to the base part 81. The lower hook 80 collides with a bottom surface 33 of the body 30 and, at that time, presses a later-explained limit switch 120. This can stop the driving of the motor 40 and thereby stop the hoisting of the lower hook 80.

<Regarding the Chain Bucket 90>

As illustrated in FIG. 1, the chain bucket 90 is a bucket-shaped portion for housing the load chain C1 discharged from a later-explained side surface chain inlet/outlet 651. The chain bucket 90 is formed of resin or cloth, as a material, which has flexibility while sufficiently bearing the weight of the load chain C1. The chain bucket 90 is attached to the bucket attachment bracket 100 via a coupling tool 110 such as a carabiner, a wire, or another. Therefore, the chain bucket 90 is in a state of being attached to the body part 20 (the body 30 and the guide member 60) via the coupling tool 110 and the bucket attachment bracket 100.

<Regarding the Bucket Attachment Bracket 100>

As illustrated in FIG. 1 to FIG. 3, the bucket attachment bracket 100 has a bucket attachment part 105. The bucket attachment part 105 is a portion to which the chain bucket 90 is attached via the coupling tool 110. In this embodiment, the bucket attachment part 105 includes an attachment arm 105*a* in an almost U-shape projecting from the side surface 31 side, and an insertion section of the coupling tool 110 can be inserted into an attachment hole 105*b* surrounded by the attachment arm 105*a*.

Note that the attachment hole 105*b* has a predetermined length along the Z-direction (namely, being in a long-hole shape along the Z-direction). Further, in the normal suspension, the coupling tool 110 is located on the Z2 side (lower side) of the attachment hole 105*b* and the chain bucket 90 can be attached via the coupling tool 110. On the other hand, in the inverted suspension, the coupling tool 110 is located on the Z1 side (upper side in the normal suspension) of the attachment hole 105*b* and the chain bucket 90 can be attached via the coupling tool 110. Accordingly, in both cases of the normal suspension and the inverted suspension, the load chain C1 hanging down due to the self weight can be well housed in the chain bucket 90.

<Regarding the Guide Member 60 and the Limit Switch 120>

The guide member 60 constitutes, together with the above-explained body 30, a structure portion of the body part 20. As illustrated in FIG. 3, the guide member 60 is provided in a manner to be close to the load sheave 50 at predetermined positions (a first position and a second position). Thus, the load chain C1 is fed out while well fitting into the chain pocket 51 located in a prescribed angle range in the body 30. Note that the guide member 60 is composed of a block body of metal having abrasion resistance and having strength, such as carbon steel, alloy steel, or the like.

Figure 4:
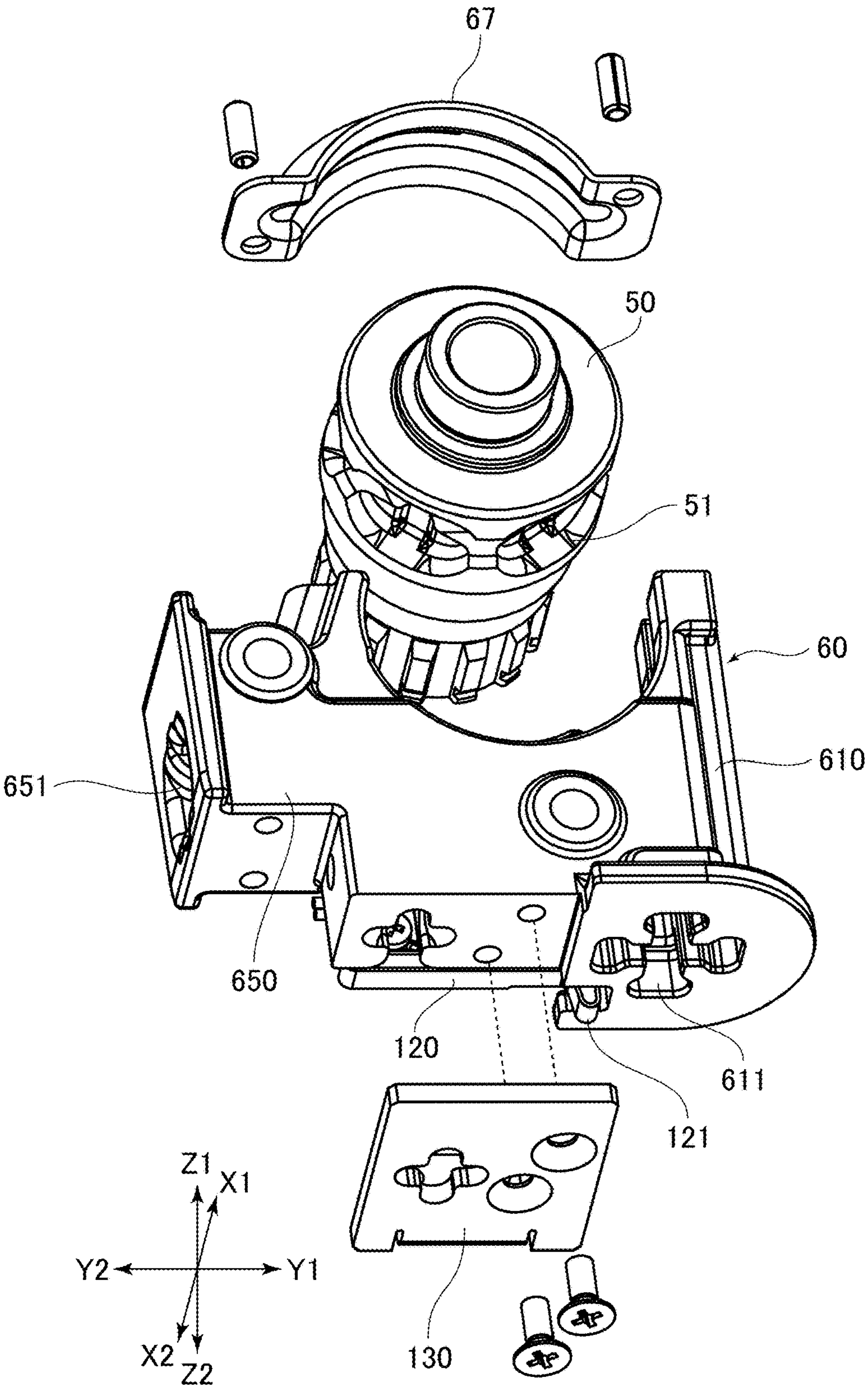
FIG. 4 is a perspective view illustrating configurations of the load sheave, an arc-shaped covering member, and a limit switch around a guide member of a body of the electric chain block illustrated in FIG. 1.

FIG. 4 is a perspective view illustrating configurations of the load sheave 50, an arc-shaped covering member 67, and the limit switch 120 around the guide member 60. As illustrated in FIG. 3 and FIG. 4, the guide member 60 is provided with the first guide passage 610 and a second guide passage 650. The first guide passage 610 is a portion which well guides the movement of the load chain C1 extending toward the lower hook 80 side (Z2 side). Note that a side of the first guide passage 610 where the load chain C1 gets in/out is called the chain inlet/outlet 611, and a side of the second guide passage 650 where the load chain C1 gets in/out is called the side surface chain inlet/outlet 651.

Figure 5:
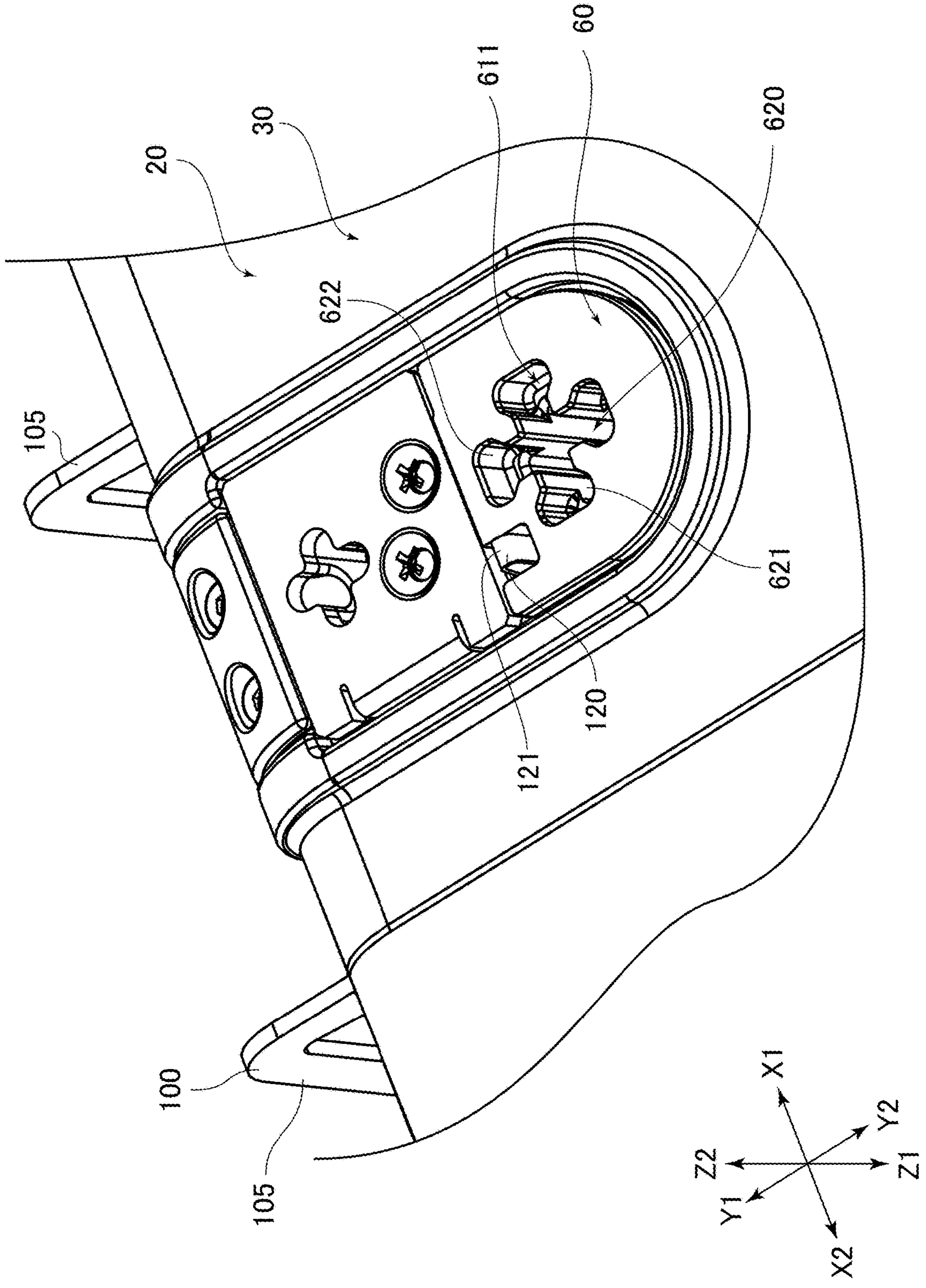
FIG. 5 is a partial perspective view illustrating a configuration near a chain inlet/outlet of the body part of the electric chain block illustrated in FIG. 1.
Figure 6:
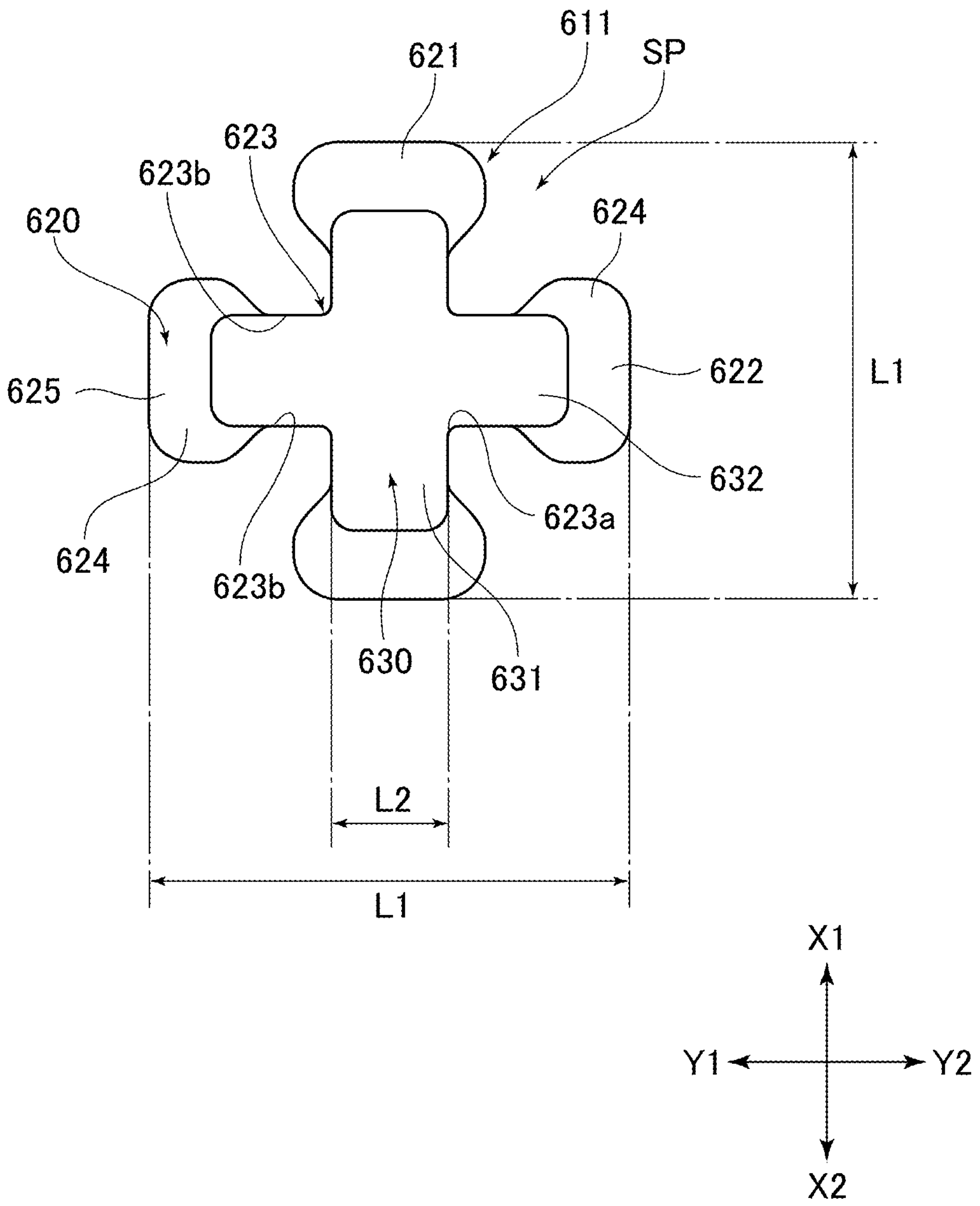
FIG. 6 is a plan view illustrating the configuration near the chain inlet/outlet of the body part of the electric chain block illustrated in FIG. 1.
Figure 7:
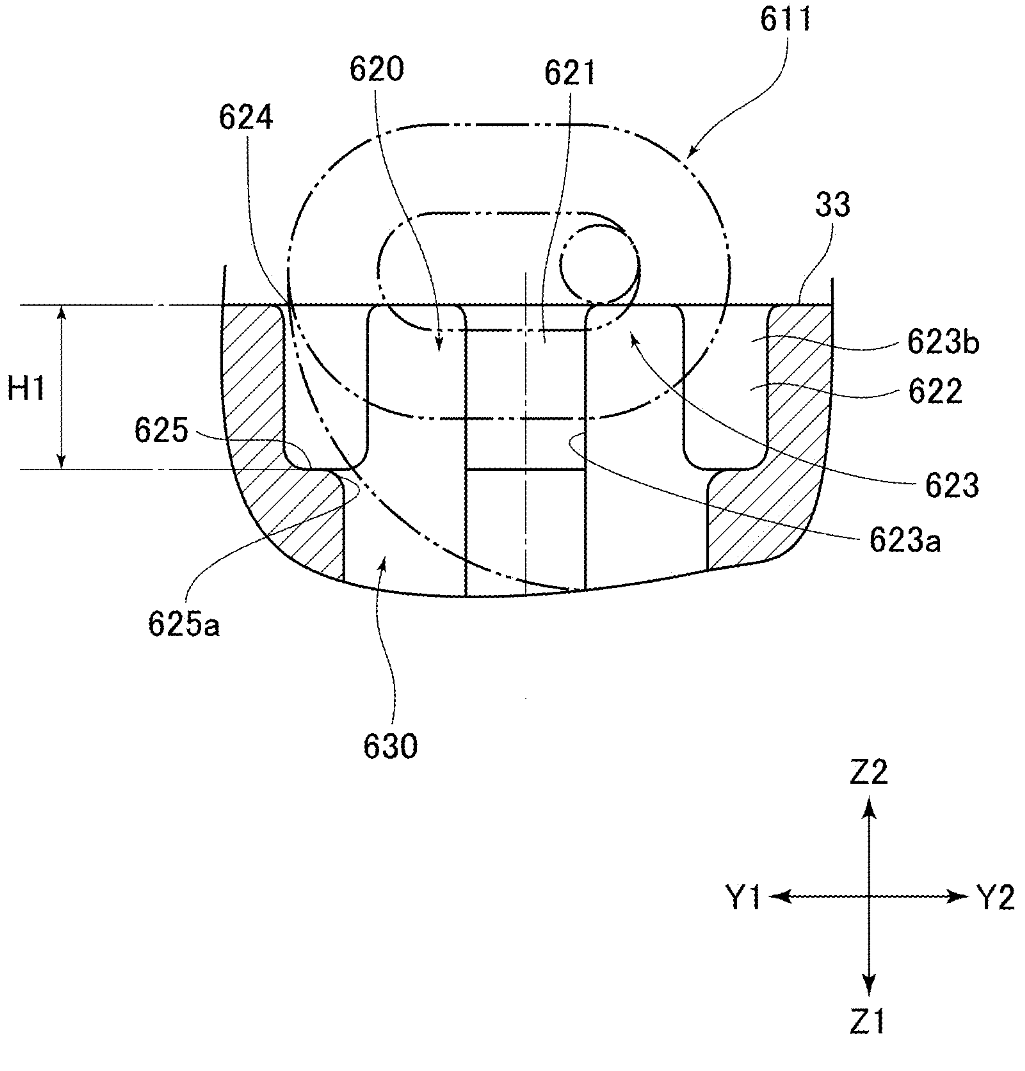
FIG. 7 is a cross-sectional view illustrating the configuration near the chain inlet/outlet of the body part of the electric chain block illustrated in FIG. 1, and a view illustrating a state cut along a first lateral groove.

FIG. 5 is a partial perspective view illustrating a configuration near the chain inlet/outlet 611 of the body part 20. FIG. 6 is a plan view illustrating the configuration near the chain inlet/outlet 611 of the body part 20. FIG. 7 is a cross-sectional view illustrating the configuration near the chain inlet/outlet 611 of the body part 20, and a view illustrating the state cut along a first lateral groove.

As illustrated in FIG. 5 to FIG. 7, the chain inlet/outlet 611 is provided with a first guide groove 620 and a second guide groove 630. More specifically, the first guide groove 620 is a portion which is provided on a side closer to an opening of the chain inlet/outlet 611 than the second guide groove 630 is. In other words, the first guide groove 620 and the second guide groove 630 are continuous, and the first guide groove 620 of them is present on the opening side of the chain inlet/outlet 611 and the second guide groove 630 is present on a side deeper in the body part 20 than the first guide groove 620 is.

Figure 8:
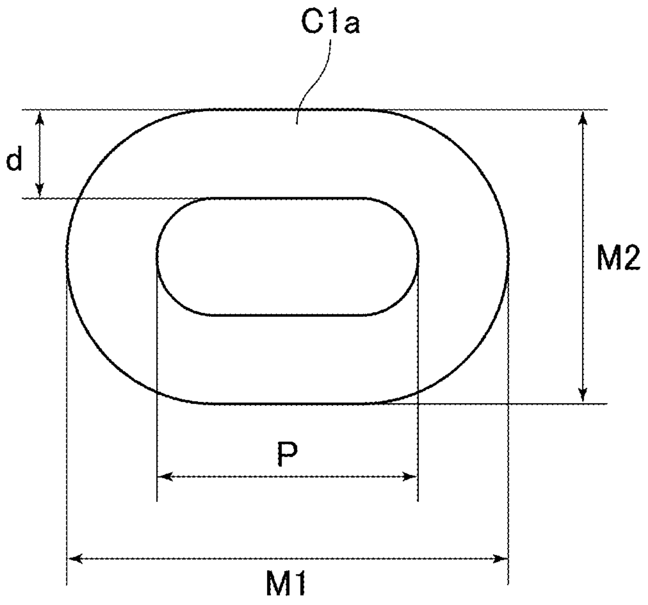
FIG. 8 is a plan view illustrating a link used in the electric chain block in FIG. 1.

The first guide groove 620 is provided with a first longitudinal groove 621 and a first lateral groove 622 which orthogonally cross each other (namely, the first longitudinal groove 621 and the first lateral groove 622 are provided in a cross-shape). A length L1 of the first longitudinal groove 621 and the first lateral groove 622 is made to correspond to a length in a long side direction of each link C1*a* of the load chain C1. FIG. 8 is a plan view illustrating the link C1*a*. As illustrated in FIG. 8, when the length in the long side direction of the link C1*a* is M1, the first longitudinal groove 621 and the first lateral groove 622 are provided to have the length L1 which is larger than the length M1.

Note that when it is assumed that a dimension in the long side direction of an inner hole of the link C1$a$ is P, a groove width of the first longitudinal groove 621 and the first lateral groove 622 is L2, and a diameter of the link C1$a$ is d, it is preferable that the length L1 of the first longitudinal groove 621 and the first lateral groove 622 is set to the following (Expression 1).

$$L1=(P-d+L2/2)\times 2 \quad \text{(Expression 1)}$$

Note that when it is assumed that the first longitudinal groove 621 is along an axial direction (X-direction) of the load sheave 50, it is preferable that the groove width L2 of the first longitudinal groove 621 (referred to as a groove width L21) is larger than the groove width L2 of the first lateral groove 622 (referred to as a groove width L22). This is because a line linking the chain pockets 51 of the load sheave 50 is a polygon and the link C1$a$ therefore slightly swings (vibrates) in the Y-direction with the rotation of the load sheave 50.

Further, the first longitudinal groove 621 and the first lateral groove 622 are provided with a narrowed part 623. The narrowed part 623 is a portion which faces the first longitudinal groove 621 and the first lateral groove 622, and four narrowed parts 623 are provided as illustrated in FIG. 6. The narrowed part 623 is provided with a tip part 623$a$ and a plane part 623$b$. The tip part 623$a$ of them is provided to be smaller in curvature radius than a corner portion of a later-explained expanded groove part 624 in order to limit the orientation of the link C1$a$. The curvature radius is preferably provided to be a curvature radius at the same level as that of the narrowed part at a current chain inlet/outlet.

Setting the curvature radius of the tip part 623$a$ not to be larger than that of the expanded groove part 624 but to be the same level as the curvature radius of the narrowed part at the current chain inlet/outlet as explained above, makes it possible to adjust the direction of the link C1$a$ entered the first longitudinal groove 621 or the first lateral groove 622 so as to be along either the first longitudinal groove 621 or the first lateral groove 622. This prevents the link C1$a$ from entering the inside of the first longitudinal groove 621 or the first lateral groove 622, in a state of not being adjusted in the direction of either the first longitudinal groove 621 or the first lateral groove 622, thereby preventing failure of hoisting with the load sheave 50.

Further, the plane part 623$b$ is a portion which is provided in parallel with the long side direction of the first longitudinal groove 621 or the first lateral groove 622. Two plane parts 623$b$ at each narrowed part 623 are provided to orthogonally cross each other. The plane part 623$b$ has a predetermined length and thereby prevents the tip part 623$a$ from being abraded in a short time. Further, the interval between the plane parts 623$b$ facing each other corresponds to the groove width L2 of the first longitudinal groove 621 or the first lateral groove 622.

Note that in this embodiment, the narrowed parts 623 are provided to be flush with the bottom surface 33. This improves the abrasion resistance of the narrowed parts 623.

Further, the first longitudinal groove 621 and the first lateral groove 622 are also provided with the expanded groove parts 624. The expanded groove parts 624 are portions of the first longitudinal groove 621 and the first lateral groove 622 which are expanded in groove width so as to have an interval larger than that of the groove width L2 at sections on sides closer to ends in the groove direction than the narrowed parts 623. Further, because of the presence of the expanded groove parts 624, the groove length of the first longitudinal groove 621 and the first lateral groove 622 is elongated to the groove length L1. In other words, because of the presence of the expanded groove parts 624 in the first longitudinal groove 621 and the first lateral groove 622, the groove length L1 of the first longitudinal groove 621 and the first lateral groove 622 is larger than the groove length of the second longitudinal groove 631 and the second lateral groove 632 of the later-explained second guide groove 630.

The expanded groove part 624 is a portion for allowing a leading portion of the link C1$a$ in a state of slightly inclining with respect to the groove direction of the first longitudinal groove 621 or the first lateral groove 622 and slightly tilting from an upstanding state to enter.

The leading portion of the link C1$a$ in the state of slightly tilting from the upstanding state enters the expanded groove part 624 to give a trigger for later-explained rotation of the link C1$a$. This can release the load chain C1 from being stuck.

Note that the expanded groove part 624 larger in size is more preferable. However, if the expanded groove part 624 is too large, a space where the limit switch 120 is to be installed in a range where the lower hook 80 collides around the chain inlet/outlet 611 is no longer present. Hence, between the adjacent expanded groove parts 624, a space SP for installing a pressed part 121 of the limit switch 120 is provided. This space SP is preferably present in a circular range having a radius from the center of the chain inlet/outlet 611 to an end portion most apart from the expanded groove part 624.

Further, as illustrated in FIG. 7, a stepped bottom surface part 625 is provided on the deep side (Z1 side) of the body part 20 in the first guide groove 620. The stepped bottom surface part 625 is a portion which is a boundary with the second guide groove 630. In other words, since the first guide groove 620 and the second guide groove 630 are different in groove length by the presence of the expanded groove parts 624, the stepped bottom surface part 625 as illustrated in FIG. 7 is formed.

Here, when it is assumed that a depth from the bottom surface 33 to the stepped bottom surface part 625 is a depth H1, the depth H1 is set so that when a link C1$a$ (abutting link) is present at one of the narrowed parts 623 of the bottom surface 33 and a link C1$a$ adjacent thereto (adjacent link) rotates using the abutting link C1$a$ as a fulcrum, the link C1$a$ (adjacent link) does not collide with the stepped bottom surface part 625. This prevents the rotation of the link C1$a$ entered the first guide groove 620 from being obstructed by the stepped bottom surface part 625, thus making it possible to release the load chain C1 from being stuck.

Note that a portion of the stepped bottom surface part 625 closer to the center of the chain inlet/outlet 611 is provided with an arc-shaped part 625$a$. Therefore, even if the link C1$a$ collides with the stepped bottom surface part 625, the link C1$a$ is smoothly guided to the second guide groove 630 side owing to the presence of the arc-shaped part 625$a$. Note that instead of providing the stepped bottom surface part 625, a boundary portion between the first guide groove 620 and the second guide groove 630 may be provided in a curved shape as a whole.

Further, the second longitudinal groove 631 present in the second guide groove 630 is made to correspond to a length M2 in a short side direction of the link C1$a$, and the width M2 is necessary and sufficient for guiding the link C1$a$. Further, the second lateral groove 632 present in the second guide groove 630 is also made to correspond to the length M2 in the short side direction of the link C1$a$, and the width M2 is necessary and sufficient for guiding the link C1*a*. When the link C1*a* enters the second longitudinal groove 631 or the second lateral groove 632, the orientation of the link C1*a* is further adjusted.

Further, the limit switch 120 is a mechanical switch which the lower hook 80 can press. The pressed part 121 of the limit switch 120 projects from the bottom surface 33, and the pressed part 121 is provided in a range where the lower hook 80 collides. Note that at least a part of the pressed part 121 preferably reaches the above-explained space SP.

Note that as illustrated in FIG. 4, a protective cover 130 is attached to an arrangement section of the limit switch 120 of the guide member 60 in order to protect the limit switch 120 from the external part.

<Regarding the Action>

The action of the electric chain block 10 having the above configuration will be explained below. In the electric chain block 10, in the case where the load chain C1 sags because no tension is applied thereto when the load chain C1 is hoisted and the links C1*a* sequentially enter the chain inlet/outlet 611, the orientations of the links C1*a* are not adjusted at the stage before the links C1*a* enter the chain inlet/outlet 611.

Figure 9:
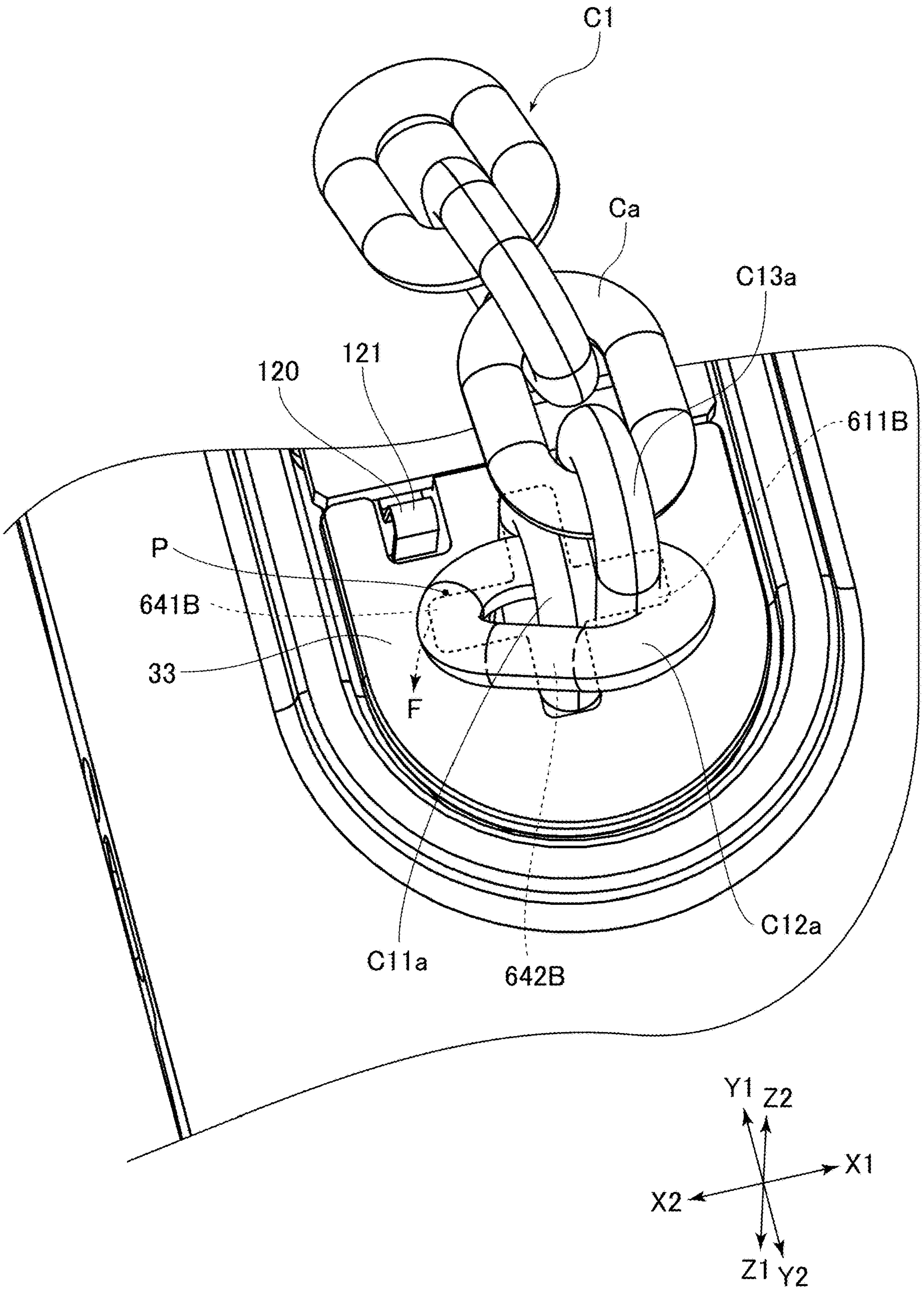
FIG. 9 is a view illustrating an example in which a load chain gets stuck around a current chain inlet/outlet.

When the load chain C1 is hoisted in a state where the links C1*a* are not aligned, the load chain C1 may get stuck. An example of such getting stuck is illustrated in FIG. 9. FIG. 9 is a view illustrating an example in which the load chain C1 gets stuck around a current chain inlet/outlet 611B. Note that the chain inlet/outlet 611B illustrated in FIG. 9 has a longitudinal groove 641B and a lateral groove 642B constant in groove width.

In the state illustrated in FIG. 9, it is assumed that a link C1*a* which has already entered the chain inlet/outlet 611B (the lateral groove 642B in FIG. 9) is a first link C11*a*, a link C1*a* coupled to the first link C11*a* is a second link C12*a*, and another link C1*a* coupled to the second link C12*a* is a third link C13*a*.

Here, in the case where the second link C12*a* collides with the point P near the chain inlet/outlet 611 of the bottom surface 33 and the third link C13*a* collides with the periphery of the chain inlet/outlet 611, when the first link C11*a* is pulled in with the rotation of the load sheave 50, the second link C12*a* tries to rotate to the side where it presses the bottom surface 33 (an arrow F side in FIG. 9).

In this case, since the third link C13*a* collides with the bottom surface 33 near the chain inlet/outlet 611 as indicated with a circular shape of a two-dotted chain line in FIG. 7, the second link C12*a* inclines in a manner to be away from the bottom surface 33 on its third link C13*a* side and to be in contact with the bottom surface 33 at the point P on its side away from the third link C13*a* in contrast thereto. Therefore, when the second link C12*a* is pulled in by the first link C11*a*, the first link C11*a* tries to rotate the second link C12*a* in a manner to further press the point P into the bottom surface 33 (namely, around the arrow F).

However, the collision of the second link C12*a* with the point P hinders the second link C12*a* from further rotating, causing the load chain C1 to get stuck.

Figure 10:
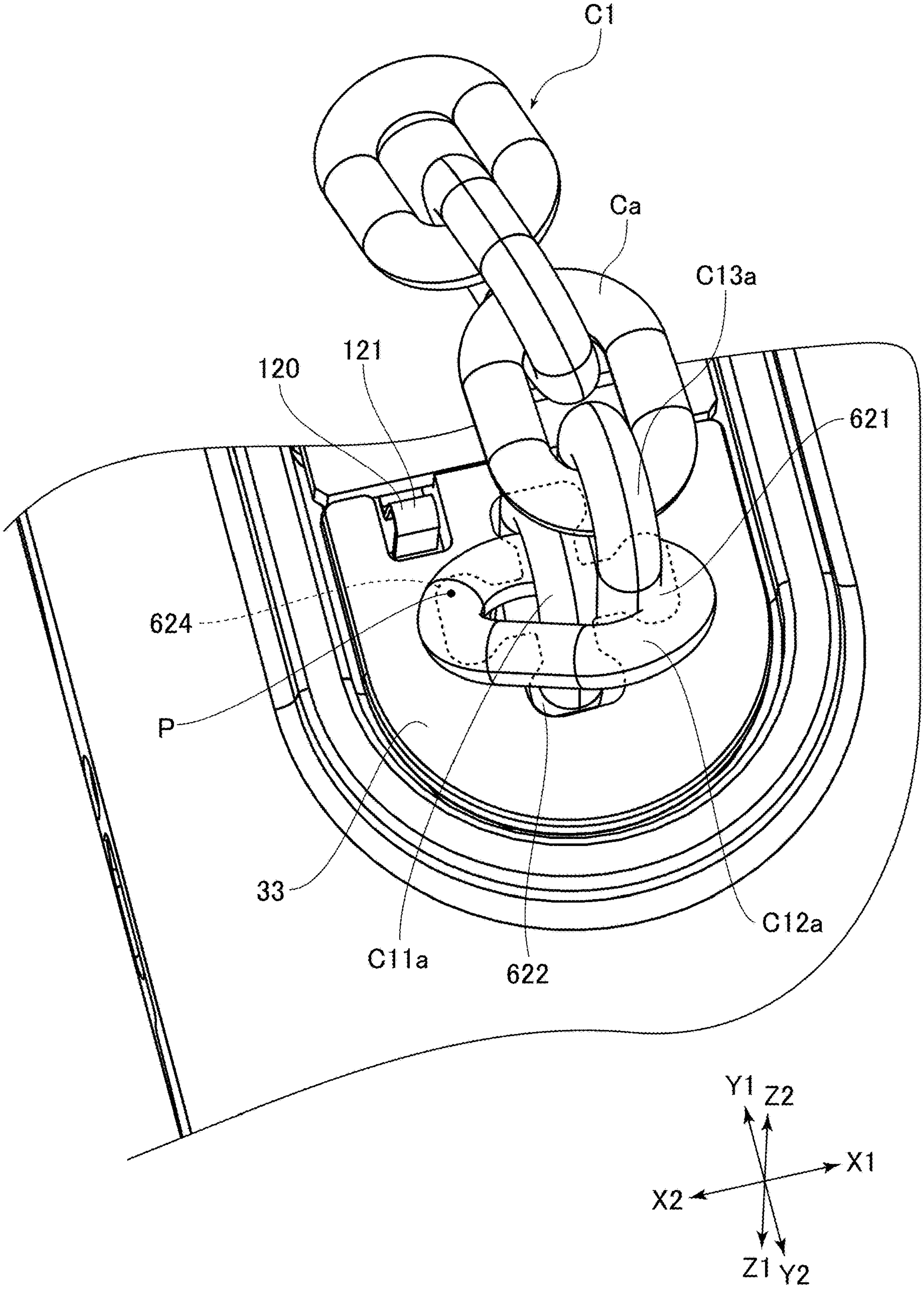
FIG. 10 is a view illustrating an image where the load chain is released from being stuck around the chain inlet/outlet owing to the presence of an expanded groove part in the electric chain block illustrated in FIG. 1.

FIG. 10 is a view illustrating an image where the load chain C1 is released from being stuck around the chain inlet/outlet 611 owing to the presence of the expanded groove part 624. As illustrated in FIG. 10, the electric chain block 10 in this embodiment is brought into a state where the aforementioned point P is not present at the bottom surface 33 but is present at the expanded groove part 624 because of the provision of the expanded groove part 624. This brings the second link C12*a* into a state where its pull-in leading side enters the first longitudinal groove 621 or the first lateral groove 622. Accordingly, in the case where the second link C12*a* is pulled in by the first link C11*a*, the second link C12*a* can change its orientation without causing jamming being the hindrance to the rotation as in the case where the point P is present at the bottom surface 33.

Note that since the orientation of the second link C12*a* can be changed as explained above, each link C1*a* can be smoothly pulled into the chain inlet/outlet 611 thereafter.

<Regarding the Effects>

The electric chain block 10 having the above configuration includes the body part 20 which includes the motor 40 and the load sheave 50, and the chain inlet/outlet 611 which is provided at the bottom surface 33 of the body part 20 and through which the load chain C1 on the load side gets in/out, and the chain inlet/outlet 611 has the first guide groove 620. The first guide groove 620 is provided on the opening side of the chain inlet/outlet 611, and includes the first longitudinal groove 621 and the first lateral groove 622 which have the groove length corresponding to the length in the long side direction of each link C1*a* of the load chain C1, and the first longitudinal groove 621 and the first lateral groove 622 orthogonally cross each other. Further, the chain inlet/outlet 611 has the second guide groove 630, and the second guide groove 630 is provided on the side deeper in the body part 20 than the first guide groove 620 is, and includes the second longitudinal groove 631 and the second lateral groove 632 which have the groove length corresponding to the length in the short side direction of each link C1*a* of the load chain C1, and the second longitudinal groove 631 and the second lateral groove 632 orthogonally cross each other.

Further, the first guide groove 620 has the narrowed parts 623 which face each other across the groove width L2 corresponding to the wire diameter of the link C1*a* of the load chain C1 in the width direction of the first longitudinal groove 621 and face each other across the groove width L2 in the width direction of the first lateral groove 622 to determine into which of the first longitudinal groove 621 and the first lateral groove 622 each link C1*a* of the load chain C1 is introduced when the link C1*a* is pulled in. Further, the first guide groove 620 has the expanded groove parts 624 which are provided on the outside further away from the center of the chain inlet/outlet 611 than the narrowed parts 623 are and have the width larger than the groove width L2.

As explained above based on FIG. 10, the presence of the expanded groove part 624 enables the leading side of the second link C12*a* to enter the expanded groove part 624. Therefore, it is possible to prevent the second link C12*a* from colliding with the bottom surface 33 at the point P as illustrated in FIG. 9 and to make the pull-in leading side of the second link C12*a* enter the first longitudinal groove 621 or the first lateral groove 622. Thus, in the case where the second link C12*a* is pulled in by the first link C11*a*, the second link C12*a* can change its orientation without causing jamming being the hindrance to the rotation as in the case where the point P is present at the bottom surface 33. Therefore, after the change of the orientation of the second link C12*a*, each link C1*a* can be smoothly pulled into the chain inlet/outlet 611. Therefore, even if the link C1*a* falls sideways or inclines, the link C1*a* can be made to easily enter the chain inlet/outlet 611.

Further, the first guide groove 620 is provided with the narrowed parts 623, so that the narrowed parts 623 can limit the orientation of the link C1*a*. In other words, it is possible to adjust the direction of the link C1*a* entered the first longitudinal groove 621 or the first lateral groove 622 so as to be along either the first longitudinal groove 621 or the first lateral groove 622. This can prevent the link C1*a*, in a state of not being adjusted in the direction of either the first longitudinal groove 621 or the first lateral groove 622, from entering the inside of the first longitudinal groove 621 or the first lateral groove 622, thereby preventing failure of hoisting with the load sheave 50.

Further, the chain inlet/outlet 611 has the narrowed parts 623 and the expanded groove parts 624 as explained above, thus eliminating the need to form a projecting portion with respect to the bottom surface 33. Therefore, when the lower hook 80 collides with the bottom surface 33 near the chain inlet/outlet 611, the pressed part 121 of the limit switch 120 can be easily pressed.

Further, in this embodiment, the first longitudinal groove 621 and the first lateral groove 622 are formed at a depth where the link C1*a* to be pulled into the first longitudinal groove 621 or the first lateral groove 622 reaches the inside of the second guide groove 630 and is rotatable in a manner to fall down using the link C1*a* (the second link C12*a*) in contact with the bottom surface 33 as a fulcrum.

This configuration ensures that using the link C1*a* in collision with the bottom surface 33 near the chain inlet/outlet 611 as a fulcrum as indicated with the circular shape of the two-dotted chain line in FIG. 7, the link C1*a* (adjacent link) coupled to the colliding link C1*a* reaches the inside of the second guide groove 630 and rotates in a manner to fall down in a state of having entered the first guide groove 620. This prevents the rotation of the link C1*a* entered the first guide groove 620 from being obstructed, thus making it possible to release the load chain C1 from being stuck.

Further, in this embodiment, the narrowed parts 623 are provided in a manner to be flush with the bottom surface 33 and to continue into the bottom surface 33. Therefore, it is possible to apply sufficient strength to the narrowed parts 623 and to improve the abrasion resistance of the narrowed parts 623.

Further, in this embodiment, at least a part of the pressed part 121 of the limit switch 120 is arranged in the space SP located in the range where the base part 81 of the lower hook 80 collides with the bottom surface 33 near the chain inlet/outlet 611. Then, the pressed part 121 is pressed to stop the driving of the motor 40.

Since at least a part of the pressed part 121 is arranged in the space SP as explained above, it becomes possible to surely press the pressed part 121 when the lower hook 80 is lifted up to the upper limit position where it collides with the bottom surface 33. Thus, it is possible to surely stop the driving of the motor 40. Therefore, it is possible to prevent damage to the body part 20 by continuing to drive the motor 40.

Modified Example

One embodiment of the present invention has been explained above, and the present invention is modifiable other than that. Hereinafter, the modifiable one will be explained.

In the above embodiment, the chain inlet/outlet 611 on the lower hook 80 side is explained. However, the side surface chain inlet/outlet 651 may also be made to include a first guide groove similar to the above-explained first guide groove 620 having the narrowed parts and the expanded groove parts and a second guide groove similar to the second guide groove 630 located on the deep side of the first guide groove.

Further, in the above embodiment, the narrowed parts 623 are provided to be flush with the bottom surface 33. However, the narrowed parts 623 are not flush with the bottom surface 33, but may slightly project or slightly dent to an extent not obstructing the press of the pressed part 121.

The invention claimed is:

1. An electric chain block for hoisting or lowering a load chain coupled to a lower hook by rotating a load sheave by driving of a motor, the electric chain block comprising:
- a body part including the motor and the load sheave; and
- a chain inlet/outlet which is provided at a bottom surface of the body part and through which the load chain on a load side gets in/out, wherein
- the chain inlet/outlet comprises:
  - a first guide groove which is provided on an opening side of the chain inlet/outlet, and includes a first longitudinal groove and a first lateral groove which have a groove length corresponding to a length in a long side direction of each link of the load chain, the first longitudinal groove and the first lateral groove orthogonally crossing each other; and
  - a second guide groove which is provided on a side deeper in the body part than the first guide groove is, and includes a second longitudinal groove and a second lateral groove which have a groove length corresponding to a length in a short side direction of each link of the load chain, the second longitudinal groove and the second lateral groove orthogonally crossing each other,
- the first guide groove comprising:
  - narrowed parts which face each other across a groove width corresponding to a wire diameter of the link of the load chain in a width direction of the first longitudinal groove and face each other across the groove width in a width direction of the first lateral groove to determine into which of the first longitudinal groove and the first lateral groove each link of the load chain is introduced when the link is pulled in; and
  - expanded groove parts which are provided on an outside further away from a center of the chain inlet/outlet than the narrowed parts are, and have a width larger than the groove width.

2. The electric chain block according to claim 1, wherein the first longitudinal groove and the first lateral groove are formed at a depth where the link to be pulled into the first longitudinal groove or the first lateral groove reaches an inside of the second guide groove and is rotatable in a manner to fall down using the link in contact with the bottom surface as a fulcrum.

3. The electric chain block according to claim 2, wherein the narrowed parts are provided in a manner to be flush with the bottom surface and to continue into the bottom surface.

4. The electric chain block according to claim 1, wherein the narrowed parts are provided in a manner to be flush with the bottom surface and to continue into the bottom surface.

5. The electric chain block according to claim 4, wherein at least a part of a pressed part of a limit switch is arranged to project in a space located in a range where a base part of the lower hook collides with the bottom surface near the chain inlet/outlet; and the pressed part is pressed to stop the driving of the motor.

* * * * *